United States Patent [11] 3,613,716

[72] Inventors Rainer Hoheisel
Kornwestheim;
Berthold Fischer, Nuertingen; Gunter
Ackermann, Stuttgart, all of Germany
[21] Appl. No. 27,800
[22] Filed Apr. 13, 1970
[45] Patented Oct. 19, 1971
[73] Assignee Robert Bosch G.m.b.H.
Stuttgart, Germany

[54] PRESSURE-RESPONSIVE CONTROL VALVE
8 Claims, 2 Drawing Figs.
[52] U.S. Cl. ...................................................... 137/491, 251/44
[51] Int. Cl. ...................................................... F16k 17/10
[50] Field of Search .......................................... 137/491, 504, 489

[56] References Cited
UNITED STATES PATENTS
2,498,542  2/1950  Gardiner ..................... 137/491
3,083,727  4/1963  Douglas ....................... 137/489
3,101,738  8/1963  Horlacher .................... 137/489
3,180,355  4/1965  Long ............................ 137/491

Primary Examiner—W. Cary Nelson
Assistant Examiner—Robert J. Miller
Attorney—Michael S. Striker ABSTRACT: A pressure-responsive control valve has a biased valve slide with a longitudinal duct forming a throttle which connects a pressure conduit with a biased pressure-responsive closure valve so that the valve slide assumes a balanced open position when sufficient pressure is applied to the pressure conduit.

INVENTORS
Rainer HOHEISEL
Berthold FISCHER
Günter ACKERMANN
BY
Michael J. Striker
their ATTORNEY

PRESSURE-RESPONSIVE CONTROL VALVE

BACKGROUND OF THE INVENTION

The present invention relates to a control valve which comprises a valve slide in a valve bore, controlling the connection between an inlet and an outlet, and having end faces located in the valve bore and forming pressure chambers in the same. A portion of the valve bore is connected with a pressure-responsive spring-biased closure valve which responds to a predetermined pressure to open so that the movement of the valve slide is controlled. After opening of the closure valve, the pressure drops in the respective portion of the valve bore whereupon the valve slide assumes an operative position connecting the inlet with the outlet.

It has been proposed to provide such a control valve with a throttle which serves the purpose to permit a small stream of the pressure medium with corresponding small losses during a regulating operation, after the connection between the inlet and outlet is interrupted by the valve slide. This construction is satisfactory under many operational conditions. However, if the preliminary pressure-responsive closure valve is not completely fluid tight in the closed position, pressure medium flows continuously out of the closure valve, so that an undesired pressure drop occurs in the valve bore in the region of the closure valve. As a result, the closing of the valve by the valve slide is prevented, since the pressure at the end of the control valve remote from the closure valve is not compensated by the corresponding counterpressure, so that hysteresis may occur.

SUMMARY OF THE INVENTION

It is one object of the invention to overcome this disadvantage of control valves according to the prior art, and to provide a pressure-responsive control valve with a throttle in a longitudinal duct of the valve slide.

Another object of the invention is to connect the conduit through which pressure medium is supplied into the valve bore by a longitudinal duct and a throttle with a relief conduit in which a pressure-responsive closure valve is provided.

With these objects in view, one embodiment of the invention comprises a valve body having a valve bore, an inlet and an outlet opening into the valve bore, a pressure conduit communicating with one end portion of the valve bore, and the relief conduit communicating with the other end portion of the valve bore,; a closure valve in the relief conduit biased to close the same and responsive to a predetermined pressure in the relief conduit to open; biasing means located in the other end portion of the valve bore; and a valve slide in the valve bore having a closing end position separating the inlet from the outlet and being biased by the biasing means to move to the closing end position, an intermediate open position in which the inlet and the outlet are connected by the valve bore, and another end position closing the relief conduit.

In accordance with the invention, the valve slide has a longitudinal inner duct which opens at the ends of the valve slide into the end portions of the valve bore, respectively, and includes a throttle.

As a result, the closure valve opens when the pressure in the pressure conduit, inner duct, end portions of the valve bore, and relief conduit exceeds the predetermined pressure to which the closure valve is set.

By opening of the closure valve, the pressure in the other end portion of the valve bore is relieved so that the pressure in said one end portion of the valve bore moves the valve slide to the intermediate open position while the throttle separates the pressure media in the end portions of the valve bore. The valve slide then moves to the other end position disconnecting the relief conduit from the other end portion of the valve bore, whereupon the pressure in the end portions of the valve bore is equalized through the throttle so that the end portions of the valve bore have a pressure differential counteracting the biasing means until the valve slide is balanced in the intermediate open position.

The biasing means is preferably a spring located in the other end portion of the valve bore and partly located in a cavity formed by the duct in the valve slide.

It is possible to connect the pressure conduit with the inlet of the valve, or to control the valve slide by a remote source of pressure medium which is connected with the pressure conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
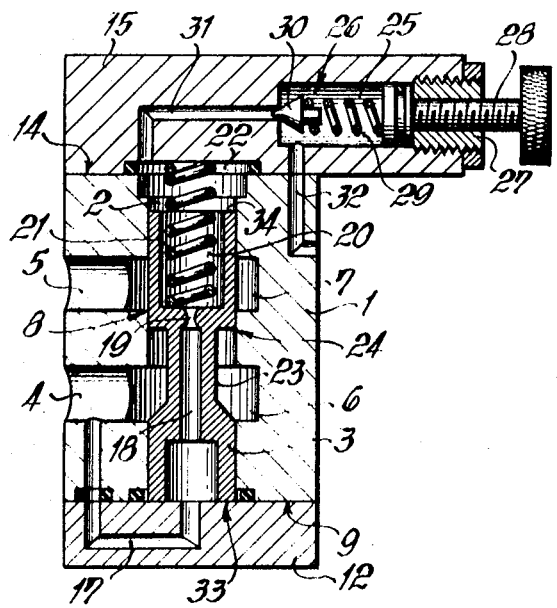
FIG. 1 is a schematic longitudinal sectional view illustrating an embodiment of the invention.
Figure 2:
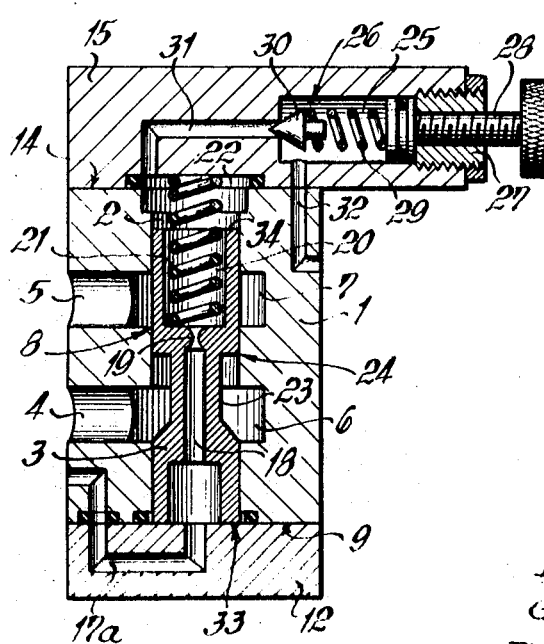
FIG. 2 is a schematic sectional view illustrating a modification of the embodiment of FIG. 2 in which the valve is controlled by a pressure medium independently of the controlled fluid.

The embodiments illustrated in FIGS. 1 and 2 differ only in a minor detail, and corresponding parts are indicated by the same reference numerals.

A valve body is formed by a main portion 1, closed at one end by a cover 12, and at the other end by a cover 15. Portion 1 has a valve bore 2 along the length thereof, closed by covers 15 and 12. A valve slide 3 is guided for longitudinal movement in the valve bore 2. The valve body has an inlet 4 and an outlet 5 ending in annular recesses 6 and 7 forming enlargements of the valve bore 2. The annular space 7 forms with a central portion of valve bore 2 a control edge 8.

Control slide 3 has two cylindrical portions, and a central annular recess 23 which forms with the upper cylindrical portion of valve slide 3 an annular control edge 24 cooperating with control edge 8. A longitudinal duct has at one end a wide cylindrical cavity or recess 16 communicating with a pressure conduit 17 provided in cover 12, and being connected with the inlet 4 in the embodiment of FIG. 1. In the embodiment of FIG. 2, the corresponding pressure conduit 17a opens a port spaced from the inlet 4, and can be connected with any source of a pressure medium, independently of the fluid which flows into inlet 4 and out of outlet 5.

The longitudinal duct in valve slide 3 has an intermediate cylindrical bore 18 which connects the cylindrical recess 16 with a throttle opening 19 which opens into another cylindrical recess 20 at the other end of the valve slide 3.

A biasing coil spring 21 abuts the recess 22 in cover 15, and also the transverse wall of valve slide 3 in which the throttle opening 19 is provided. Consequently, valve slide 3 is biased to assume an end position abutting cover 12, as shown in FIG. 1.

Cover 15 has a relief conduit 31 opening into the recess 22 and communicating with the respective end portion of valve bore 2. Relief conduit 31 has a wide bore portion 25 and forms a valve seat against which a conical valve member 30 abuts due to the action of a spring 29 provided in bore 25 and abutting an adjustment member 28 which is threaded into a threaded bushing 27. By turning spindle 28, the pressure required in relief conduit 31 for opening the closure valve 26 can be adjusted so that the pressure in relief conduit 31 and in the communicating end portion of valve bore 2 is relieved when closure valve 26 opens at a predetermined pressure whereby closure valve 26 serves as a preliminary control valve. The cylindrical bore 25 communicates with the second portion 32 of relief conduit 31 so that pressure fluid can escape when closure valve 26 opens.

Relief conduit 32 may be connected with a container, not shown, or with any other low-pressure space.

In the illustrated close position of valve slide 3, the annular rim 33 abuts the surface 9 or cover 12, while the annular rim 34 is spaced from the surface 14 of cover 15 and from recess 22. The control edge 24 is separated from control edge 8 so that there is no communication between the inlet 4 and the outlet 5.

When fluid under pressure is supplied to the inlet 4, it flows into recess 6 and also through pressure conduit 17, cylindrical recess 16, bore 18, throttle opening 19, and cylindrical recess 20 into recess 22 and portion 31 of relief conduit 31, 25, 32. Since valve 26 is closed, the same pressure prevails in both end portions of valve bore 2 and at the ends of valve slide 3. Consequently, spring 21 urges the valve slide 3 to one end position illustrated in the drawing.

In the embodiment of FIG. 2, a pressure medium from another source is supplied into conduit 17a, and since the pressure at both ends of valve slide 3 is the same, as explained above, the valve remains closed and the connection between inlet 4 and outlet 5 interrupted.

It is assumed that the preliminary control vale 26 has been previously adjusted to a predetermined pressure. When the pressure in conduit 17, or 17a, rises, the pressure in relief conduit 31 also rises, and when the predetermined pressure to which valve 26 was set is exceeded, valve 26 opens, and valve member 30 moves away from its seat in relief conduit portion 31. Fluid is discharged from the upper end portion of valve bore 2 bounded by rim 34 of valve slide 3 so that the pressure drops in this space and in recess 20 of valve slide 3. Since less pressure fluid flows through throttle 19 than is discharged through the valve 26, the pressure in the recess 16 and in the corresponding end portion of valve bore 2 becomes greater than the pressure in recess 20 and the corresponding end portion of the valve bore 2 so that valve slide 3 moves away from cover 12 and toward cover 15. During this movement, valve slide 3 assumes an intermediate open position in which control edge 24 is located in recess 7 so that inlet 4 and outlet 5 are connected by annular recess 6 and 7 and the recess 23 in valve slide 3. The pressure fluid can now flow out of outlet 5 to a consumer.

When control valve 3 arrives in its end position in which its circular rim 34 abuts recess 22, the port of relief conduit 31 in recess 22 is separated from recess 20 and from the respective end portion of the valve bore. Since the relief conduit 31 is thus closed, pressure fluid flowing through throttle 18 increases the pressure in recess 20 which is closed by cover 15. Consequently, spring 21 prevails to move control slide downward toward cover 12. Such movement stops when there is an equilibrium between the pressure differential on opposite sides of throttle 19, and the force of spring 21.

An adhering of the rim 34 of valve slide 3 to the bottom of the recess 22 of cover 15 cannot occur due to the action of the spring and the pressure differential. An adhering of the rim 34 of slide valve 3 to the bottom of recess 22 of cover 15 cannot occur. If the seal of valve member 30 is not perfect, which may occur due to dirt or wear, the slight loss of pressure fluid is in no way detrimental.

In the embodiment of FIG. 2, the pressure fluid by which the valve operations are controlled is supplied through pressure conduit 17a independently of inlet 4, so that another fluid is controlled by valve body 3 to flow from inlet 4 into outlet 5 in accordance with the pressure of the fluid supplied to pressure conduit 17a.

It will be understood that each of the elements described above, or two or more together, may also find a useful application in other types of control valves differing from the types described above.

While the invention has been illustrated and described as embodied in a pressure-responsive control valve including a valve slide having a longitudinal duct with a throttle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A pressure-responsive control valve comprising a valve body having a valve bore, an inlet and an outlet opening into said valve bore, a pressure conduit communicating with one end portion of said valve bore, and a relief conduit communicating with the other end portion of said valve bore; a relief and closure valve in said relief conduit biased to close the same and responsive to a predetermined pressure in said relief conduit to open; biasing means located in the other end portion of said valve bore; and a valve slide in said valve bore having a closing end position separating said inlet from said outlet and being biased by said biasing means to move to said closing end position, an intermediate open position in which said inlet and outlet are connected by said valve bore, and another end position closing said relief conduit, said valve slide having a longitudinal inner duct which opens at the ends of said valve slide into said end portions of said valve bore, respectively, and includes a throttle so that said relief and closure valve opens when the pressure in said pressure conduit, inner duct, end portions of said valve bore, and relief conduit exceeds said predetermined pressure whereby the pressure in said other end portion is relieved so that the pressure in said one end portion moves said valve slide to said intermediate open position while said throttle separates the pressure media in said end portions of said valve bore, and then moves said valve slide to said other end position disconnecting said relief conduit from said other end portion whereupon the pressure in said end portions is equalized through said throttle so that said end portions have a pressure differential counteracting said biasing means until said valve slide is balanced in said intermediate open position.

2. Pressure-responsive control valve as claimed in claim 1 wherein said pressure conduit is connected with said inlet.

3. Pressure-responsive control valve as claimed in claim 1 wherein said pressure conduit opens on the outside of said valve body to form a port adapted to be connected with a source of a pressure medium.

4. Pressure-responsive control valve as claimed in claim 1 wherein said duct forms large cavities at the ends of said valve slide connected by a narrow opening forming said throttle.

5. Pressure-responsive control valve as claimed in claim 4 wherein said biasing means is a spring partly located in said other end portion of said valve bore and partly located in the respective cavity of said duct.

6. Pressure-responsive control valve as claimed in claim 1 wherein said relief conduit has one end opening into said other end portion of said valve bore and a portion formed as a valve seat; and wherein said relief and closure valve includes a valve member and a spring urging said valve member against said seat.

7. Pressure-responsive control valve as claimed in claim 1 wherein said valve slide has a circular rim located in said other end portion of said valve bore and abutting said valve body in said other end position of said valve slide so as to separate said relief conduit from said other end portion of said valve bore, and from has outlet.

8. Pressure-responsive control valve as claimed in claim 1 wherein said valve bore is cylindrical; wherein said valve slide has cylindrical end portions and an annular recess between the same bounded by control edges cooperating with said inlet and outlet; wherein said duct includes cylindrical recesses at the ends thereof having different diameters; and wherein said valve body has a wall between said cylindrical recesses having a throttle opening forming said throttle.